US007164355B2

(12) United States Patent
Schnaare et al.

(10) Patent No.: US 7,164,355 B2
(45) Date of Patent: Jan. 16, 2007

(54) PROCESS TRANSMITTER WITH A PLURALITY OF OPERATING MODES

(75) Inventors: Theodore Schnaare, Carver, MN (US); Amanda Richardson, Shakopee, MN (US)

(73) Assignee: Rosemount Inc., Eden Prairie, MN (US)

( * ) Notice: Subject to any disclaimer, the term of this patent is extended or adjusted under 35 U.S.C. 154(b) by 161 days.

(21) Appl. No.: 10/849,178

(22) Filed: May 19, 2004

(65) Prior Publication Data

US 2005/0258959 A1 Nov. 24, 2005

(51) Int. Cl.
G08B 1/08 (2006.01)
H04Q 7/00 (2006.01)
(52) U.S. Cl. .................................. 340/539.26; 702/89
(58) Field of Classification Search .......... 340/539.26; 702/60, 89, 99, 88, 107; 324/74, 130
See application file for complete search history.

(56) References Cited

U.S. PATENT DOCUMENTS

| 4,200,933 A | | 4/1980 | Nickel et al. ............... 364/571 |
| 4,414,638 A | * | 11/1983 | Talambiras ................. 702/107 |
| 4,581,714 A | * | 4/1986 | Reid .......................... 702/86 |
| 4,642,636 A | * | 2/1987 | Smith et al. ........... 340/870.04 |
| 4,663,586 A | * | 5/1987 | Swerlein et al. ............ 324/115 |
| 4,922,432 A | | 5/1990 | Kobayashi et al. ......... 364/490 |
| 4,989,649 A | | 2/1991 | Weiler et al. .................. 141/1 |
| 5,012,667 A | * | 5/1991 | Kruse ......................... 73/1.34 |
| 5,111,413 A | | 5/1992 | Lazansky et al. ........... 364/578 |
| 5,332,974 A | * | 7/1994 | Harkins et al. ............. 324/606 |
| 5,503,064 A | | 4/1996 | Scheel et al. ................ 99/453 |
| 5,642,301 A | | 6/1997 | Warrior et al. ......... 364/571.02 |
| 5,822,225 A | * | 10/1998 | Quaderer et al. ............. 702/89 |
| 6,084,394 A | * | 7/2000 | Windsheimer et al. ..... 324/130 |
| 6,117,285 A | | 9/2000 | Welch et al. ............... 204/237 |
| 6,142,169 A | | 11/2000 | Lees et al. .................. 137/240 |
| 6,380,726 B1 | * | 4/2002 | Szabo ........................ 324/115 |
| 6,495,049 B1 | | 12/2002 | Van Esch .................... 210/709 |
| 6,577,961 B1 | * | 6/2003 | Holdsclaw et al. ........... 702/60 |
| 6,673,311 B1 | | 1/2004 | Sotoyama et al. ............. 422/1 |
| 6,749,759 B1 | | 6/2004 | Denes et al. ................ 210/748 |
| 6,818,178 B1 | | 11/2004 | Kohl et al. ................... 422/26 |

OTHER PUBLICATIONS

"Notification of Transmittal of the International Search Report and the Written Opinion of the International Searching Authority, or the Declaration" in connection with corresponding application PCT/US2005/013538.

* cited by examiner

*Primary Examiner*—John Tweel, Jr.
(74) *Attorney, Agent, or Firm*—Westman, Champlin & Kelly, P.A.

(57) ABSTRACT

A transmitter for measuring a process variable of an industrial process includes a sensor adapted to measure the process variable and to generate a sensor output. A mode selector is adapted to select between operational modes. At least one operational mode is related to an operational range of the sensor. Circuitry is adapted to compensate the sensor output according to the at least one operational mode and to generate a transmitter output representative of the measured process variable.

34 Claims, 5 Drawing Sheets

PROCESS TRANSMITTER WITH A PLURALITY OF OPERATING MODES

BACKGROUND OF THE INVENTION

The present invention relates to a transmitter provided with an advanced function adapted to switch between predefined operating modes corresponding to specific process conditions.

Generally, process transmitters are used to monitor and control industrial processes by measuring various characteristics of process materials used in the process. Typically, such monitored process materials are fluids or fluid mixtures in either a liquid or a gas phase. As used herein, the terms "fluid" and "process fluid" include both liquid and gas phase materials and mixtures of such materials.

One characteristic of process fluid that is frequently monitored is pressure. The pressure may be a differential pressure, or it may be a line, gauge, absolute or static pressure. In some installations, the measured pressure is used directly. In other configurations, the measured pressure is used to derive other process variables. For example, a differential pressure measured across a flow restriction within a pipe is related to the rate of fluid flow within the pipe. Similarly, a differential pressure measured between two vertical locations in a tank is related to the level of liquid contained in the tank.

Process transmitters are used to measure such process variables and to transmit the measured process variable to a remote location, such as a control room. A transmission can occur over various communication mediums such as, for example, a two-wire process control loop, a wireless communications link, and the like.

In installations where the process variable to be measured is pressure, pressure sensors are typically used within the process transmitters. The pressure sensors provide output signals related to applied pressure. The relationship between the output signal and the applied pressure is known to vary between pressure sensors. Generally, such variations are functions of the applied pressure and the temperature of the pressure sensor, and such variations are sometimes a function of a static pressure.

To improve the accuracy of measurements taken by the pressure sensors, each pressure sensor typically undergoes a characterization process during manufacture. The characterization process involves applying known pressures to the pressure sensor and measuring the output of the pressure sensor. Typically, the data is also taken at different temperatures. For example, a pressure sensor might be characterized by a pressure of 0 and 250 inches taken at 10 evenly spaced intervals of twenty-five inches, fifty inches, and so on. Multiple data sets can be taken at different temperatures. The data is then fit to a polynomial curve, for example, by using a least squares curve fitting technique. The coefficients of the polynomial are then stored in a memory of the transmitter and used to compensate subsequent pressure measurements taken by the pressure sensor. In general, the characterization information may be stored as polynomial coefficients or as characterization values in a look up table.

In pharmaceutical, biopharmaceutical, and food and beverage applications, the industrial system and its components must typically be sterilized prior to use, which means that from time to time the system must be flushed out with steam, for example. Additionally, in some installations, there are subsystems within the process that must be maintained within a range of temperatures that is narrower than the typical characterization range.

Since the sensors are typically characterized over a series of intervals and temperatures, the fit of the polynomial within the narrower range of temperatures may lead to "residual" temperature errors at specific temperatures throughout the operating range.

SUMMARY OF THE INVENTION

In one embodiment, a transmitter measures a process variable of an industrial process. The transmitter includes a sensor adapted to measure the process variable and to generate a sensor output. A mode selector is adapted to select between operational modes. At least one operational mode is related to an expected range of the sensed process variable. Circuitry is adapted to compensate the sensor output according to the at least one operational mode and to generate a transmitter output representative of the measured process variable.

In another embodiment, a transmitter for measuring a process variable associated with an industrial process includes a sensor adapted to measure the process variable and to generate a sensor output. A mode selector is adapted to select between operating modes of the pressure sensor. Each operating mode corresponds to characterization coefficients associated with the sensor output under a range of operating conditions. Circuitry is adapted compensate the sensor output to generate a transmitter output signal representative of the pressure.

In another embodiment, a process sensor for measuring a process variable of an industrial process is characterized for compensation of the measured process variable for two or more operating modes. A sensing element is adapted to measure the parameter and to generate a sensor output. A microprocessor is adapted to process the sensor output into a transmitter output according to one of the two or more operating modes. A transceiver is adapted to transmit the transmitter output to a control center.

DETAILED DESCRIPTION OF THE PREFERRED EMBODIMENTS

Figure 1:
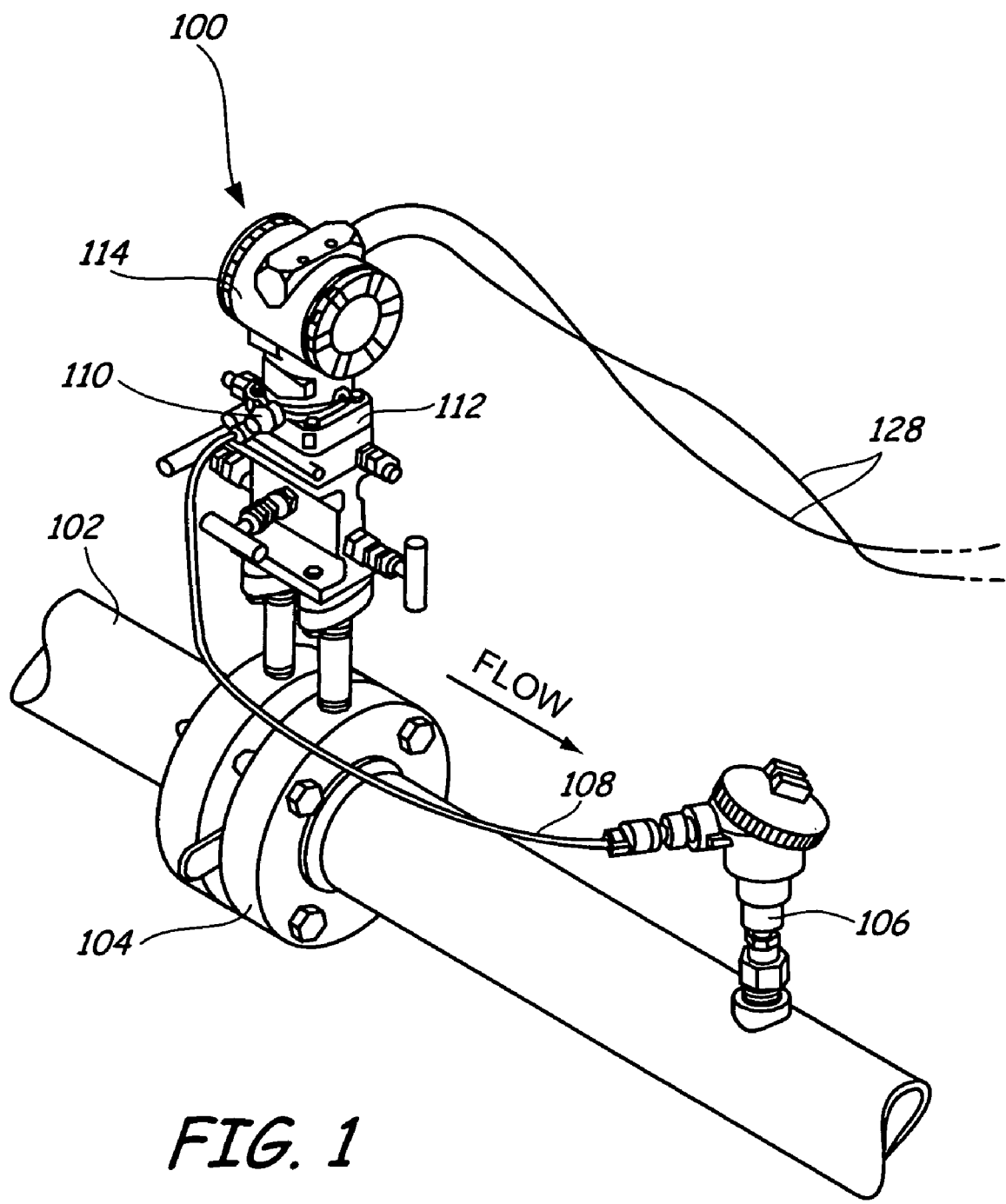
FIG. 1 is a perspective view of a flow transmitter in a process control or monitoring system.

Prior to describing the present invention in detail, one embodiment of an environment in which it can be used is described. FIG. 1 illustrates an example of a process transmitter 100 for use in process monitor and control applications in which the invention may be implemented. FIG. 1 shows a transmitter 100 mechanically coupled to pipe 102 through pipe flange 104. A fluid such as natural gas flows through pipe 102. Transmitter 100 measures differential pressure, absolute pressure and temperature, and provides an output signal related to mass flow of the fluid.

In operation, temperature sensor 106 senses a process temperature downstream from the flow transmitter 100. The analog sensed temperature is transmitted over a cable 108 and enters transmitter 100 through an explosion proof boss 110 on the transmitter body. In an alternative embodiment, the temperature sensor may be internal to the housing, and no explosion proof boss 110 is required. Transmitter 100 senses differential pressure and receives an analog process temperature input. The transmitter body preferably includes an electronics housing 112 connected to a sensor module housing 114. Transmitter 100 is connected to pipe 102 via a standard three or five valve manifold.

Figure 2:
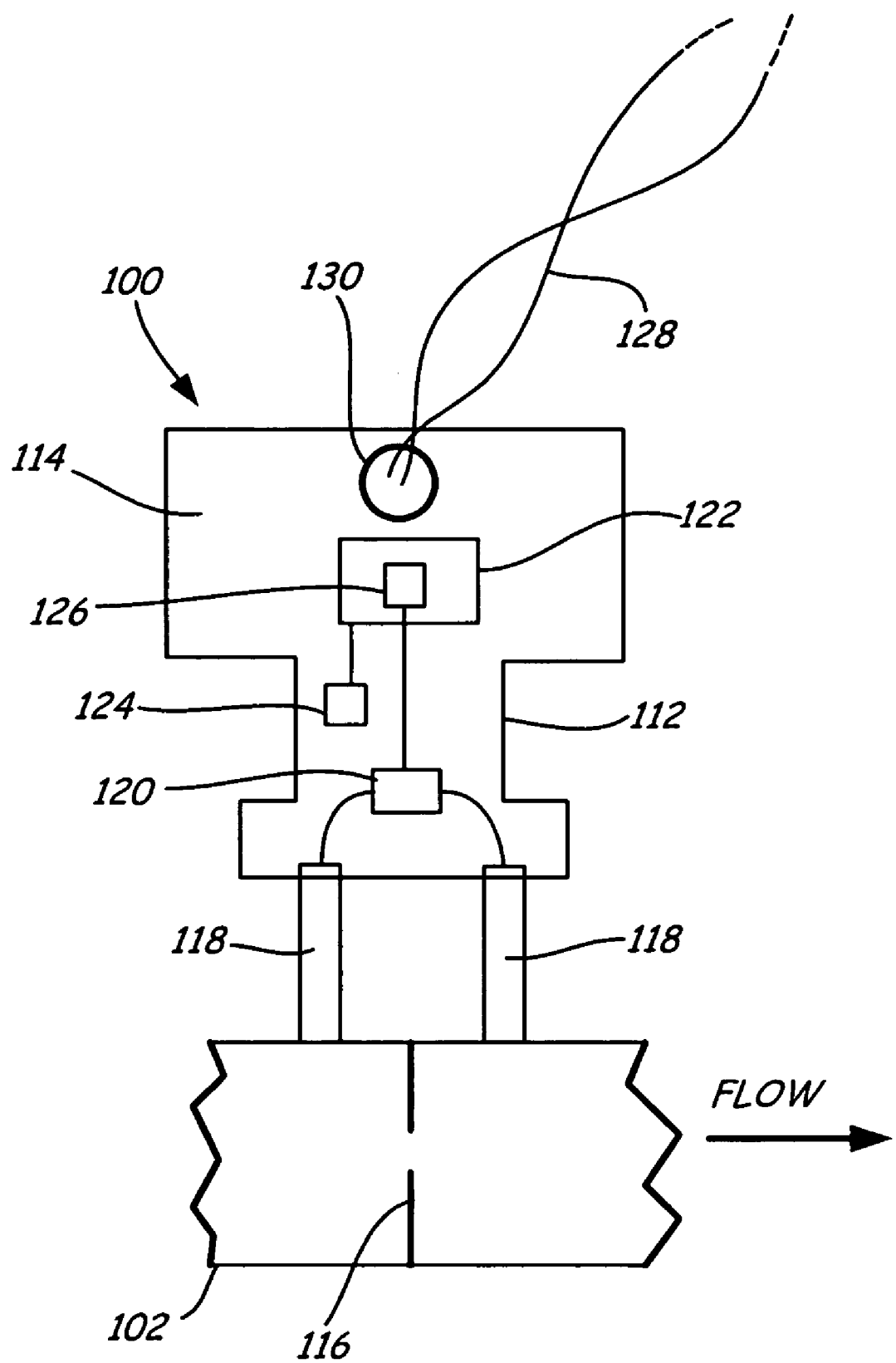
FIG. 2 is a cross-sectional schematic view of the flow transmitter shown in FIG. 1.

FIG. 2 is a cross-sectional schematic view of transmitter 100 shown in FIG. 1. In FIG. 2, a restriction referred to as a primary element 116 is shown in pipe 102. Process couplings 118 are coupled on either side of restriction 116 and are used to provide a differential process pressure to pressure inputs of transmitter 100. For example, isolation diaphragms (not shown) can be used to isolate an internal fill fluid carried in transmitter 100 from the process fluid carried in process couplings 118. A differential pressure sensor 120 receives the process pressure and provides an input signal to electronic circuitry 122. Additionally, a temperature sensor 124 provides an input to electronic circuitry 122 which is related to the temperature of pressure sensor 120. The temperature sensor 124 can be at any location but preferably provides an accurate indication of the temperature of pressure sensor 120. Typically, the temperature sensor 124 is used in addition to the temperature sensor 106 shown in FIG. 1.

In accordance with the present invention, electronic circuitry 122 compensates for errors in the pressure measurement using a compensation formula. The compensation formula can comprise a polynomial in which coefficients of the polynomial are stored in a memory 126 in transmitter 100. The polynomial is a function of sensed pressure and measured temperature. The calculated pressure can then be transmitted directly on process control loop 128 by a transmitter 130 or can be used to derive other process variables such as process flow. Digital circuitry, such as, for example a microprocessor in the electronic circuitry 122 can perform the polynomial computation and other computations. Alternatively, the electronic circuitry 122 may determine the appropriate compensation from a characterization look up table stored in the memory 126.

Although FIGS. 1 and 2 illustrate a transmitter configured to measure flow rate based upon a differential pressure, the present invention is applicable to other types of process transmitters. In general, the present invention is applicable to any type of transmitter or process device for which the temperature of the sensing element is factored into the output signal. In some installations, the present invention may also be applicable where the temperature of the process material is thermally conducted to the electronics housing.

Typically, prior art pressure sensors used in process transmitters undergo a commissioning (or "characterization") process during manufacture. This commissioning process is referred to as C/V (Characterized and Verify). During C/V, the pressure sensor is exposed to various pressures across the expected pressure range of the sensor. The measurements are taken at a number of fixed pressures, which are evenly (uniformly) distributed through the pressure range. For each applied pressure, the output of the pressure sensor or pressure measurement circuitry is stored. The characterization process is typically performed at a number of different temperatures. Using the stored outputs from the pressure sensor at each of the data points obtained for each applied pressure and temperature, a curve fitting technique is used to generate coefficients of a polynomial. A typical polynomial includes five coefficients related to pressure and four coefficients related to temperature. The coefficients are stored in a memory of the transmitter and are used to correct pressure sensor readings during operation of the transmitter.

The present invention includes the recognition that in some applications it is desirable to increase the accuracy of the pressure sensor measurements through a particular temperature subrange, which is less than the entire characterization temperature range. For example, in food and beverage and in pharmaceutical and biopharmaceutical applications, sometimes it is desirable to sterilize the system using a process sometimes referred to as a Sterilize-in-place (SIP) process. The SIP process involves filling the system with steam at a pre-determined pressure for a pre-set duration in order to sterilize all of the components that may come into contact with the process fluid. During the SIP process, the temperature of the system and of the pressure transmitters attached to the system rises to a temperature above the boiling temperature of water and is maintained within a narrow temperature band for the pre-set period of time. During this SIP process, it is desirable to be able to continue to utilize the pressure sensors to monitor the pressure of the system, so that system components are not overpressured and to ensure that the system is maintained within the correct temperature/pressure range for the desired bacterial sterilization.

The present invention improves the accuracy of the characterization polynomial by taking more data points, or by taking data points closer together, through a particular subrange of the characterization range. These extra (or more closely spaced) data points provide increased accuracy of the characterization polynomial through the selected subrange. The present invention utilizes non-uniform spacing of pressure compensation points over the operating range of the pressure sensor in order to provide additional compensation calculation data points through a desired subrange of the operating range. More specifically, the present invention utilizes non-uniform spacing of pressure compensation points within a selected temperature range, thereby acquiring more compensation data points for a better polynomial fit within the selected temperature range. Alternatively, the present invention utilizes a two characterization processes, one involving uniformly spaced pressure compensation points throughout the operating range and the other involving more closely spaced pressure compensation points through a desired subrange of the operating range. The distribution of the characterization data points is, in general, non-uniform and can be selected as desired. For example, the distribution can be in accordance with a step change, a ramp or sloping change, or more complex functions such as logarithmic or exponential changes. An example of a characterization process that could be utilized in pressure transmitters of the present invention is discussed in co-pending U.S. patent application Ser. No. 10/675,214, filed on Sep. 30, 2003 and entitled "CHARACTERIZATION OF PROCESS PRESSURE SENSOR", which is incorporated herein by reference in its entirety.

By understanding the conditions that prevail during certain operations (such as normal operating conditions, SIP operating conditions and so on), the process transmitter can be characterized for optimal performance under those known conditions. Prior to changing the operating conditions, the user can change the mode of the process transmitter through a communications interface. Alternatively, the process transmitter can change its own mode by detecting the process conditions associated with a particular mode and changing its own mode to match the process conditions.

The present invention includes a transmitter or other process device adapted to switch between modes of operation, such as normal operating mode, SIP mode, Water-for-Injection mode, Liquid Chromatography mode, and the like. In general, the process of switching between modes involves selecting between compensation polynomial coefficients optimized for particular process conditions. Ideally, the process transmitter is switched to a mode that is associated with the appropriate compensation polynomial coefficients, allowing the compensation to be optimized for the particular mode of operation.

From the process transmitter's perspective, a mode is generally a state corresponding to a set of predetermined characterization coefficients. From the perspective of the process, a mode is an operating condition characterized by temperature, pressure, or other process variables or combinations thereof. Ideally, the operating mode of the process transmitter is tuned to the operating conditions of the process so as to optimize the accuracy of the sensed parameters using the characterization coefficients. In other words, if a process transmitter stores characterization coefficients associated with a standard range of temperatures (normal mode) and with a narrow range of temperatures (other mode), when the process temperature rises into the narrow range the other mode should be used for the compensation process. Thus the transmitter performance (specifically the temperature effect) can be optimized for the narrow band of operation.

As previously discussed, in order to achieve the level of purity required in pharmaceutical, biopharmaceutical, and food and beverage applications for example, the conduits, storage vessels and reaction vessels are routinely sterilized through the introduction of high pressure steam. The pressure transmitters connected to the vessels being cleaned are relied upon to monitor and, in some cases, control sterilization pressure. While currently available microprocessor-based pressure transmitters are capable of correcting their output for changes in temperature, significant temperature induced errors may arise. Thus, there remains an on-going need for improved temperature compensation.

Figure 3:
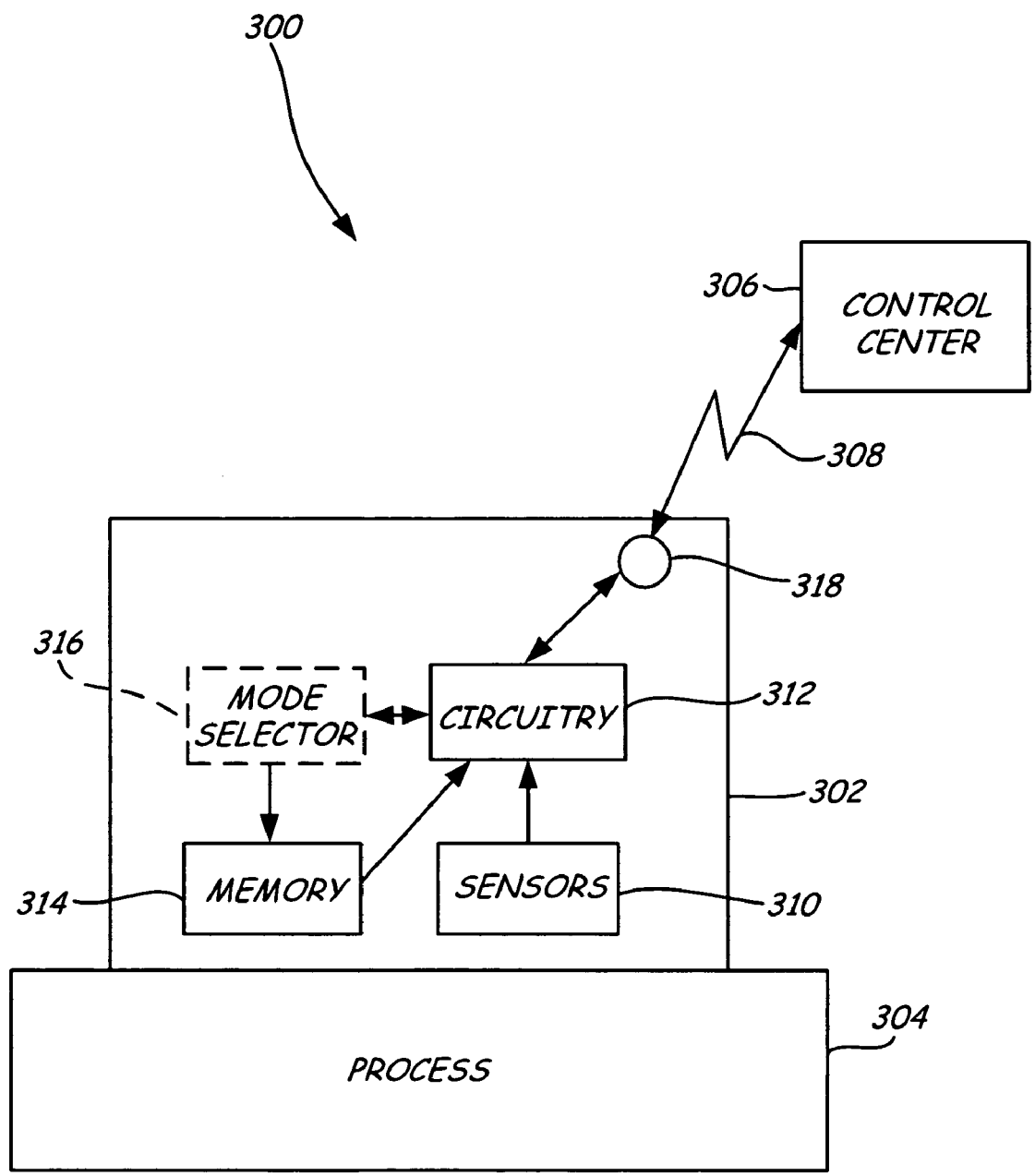
FIG. 3 is a simplified block diagram of a system having a plurality of operating modes according to an embodiment of the present invention.

FIG. 3 illustrates a simplified block diagram of a system 300 according to the present invention. The system 300 has a transmitter 302 mechanically coupled to a process 304 and connected to control center 306 via communications link 308 (which may be wired or wireless).

Sensors 310 are disposed within the transmitter 302 and are adapted to sense a process parameter (such as pressure) of the process 304. The sensors 310 may also include a temperature sensor adapted to measure the temperature of another sensor (such as for example the temperature of the pressure sensor). The sensors 310 generate outputs associated with the sensed parameters, and the output is passed to the circuitry 312, which utilizes the compensation polynomial equations to compensate the sensed output prior to transmitting the sensed output to the control center 306 via the communications link 308.

Memory 314 stores the characterization coefficients calculated during the characterization process both for an ordinary operating range and for a narrower band of operation, which hereinafter will be referred to as "Modes". Whenever the circuitry 312 compensates the sensed parameters received from the sensors 310, a microprocessor within the circuitry 312 utilizes the stored coefficients to perform the compensation. Mode selector 316 selects which set of characterization coefficients the memory 314 provides to the circuitry 312. Circuitry 312 compensates the sensed parameter and generates a compensated ("groomed") output signal, which is passed to transceiver 318 for transmission over communications link 308.

The mode selector 316 may be an advanced software feature. Alternatively, the mode selector 316 may be implemented in circuitry. In either instance, the mode selector 316 may be controlled via signals transmitted from the control center 306.

In general, the mode of operation for the process is often known in advance of the change. For example, some industrial processes are performed in batches. During batch processing, the ordinary operating mode is used. However, between batches or periodically, the conduits and vessels of the process must be sterilized. When sterilization is to occur, control center 306 transmits a mode selection signal over the communications link 308 to the transmitter 302. The transceiver 318 receives the mode selection signal and delivers the received signal to a controller within the circuitry 312, which causes the mode selector 316 to change modes. The memory 314 then outputs the characterization coefficients associated with the selected mode, which can then be utilized by the circuitry 312 to produce an output that is tuned to the mode of operation of the process 304.

Mode selector 316 may be part of the circuitry 312 or may be a separate circuit. Mode selector 316 may be implemented as a software feature within the circuitry 312. In general, mode selector 316 is shown in phantom to indicate that it is not necessarily separate from the circuitry 312.

In general, the SIP process is operated within a narrow band of temperature above the boiling point of water. Accurate pressure measurements within the narrower temperature band are desirable to ensure complete sterilization and to prevent against over-pressurization of system components. However, the SIP process represents only one of many potential Modes in which an operator may wish to maintain the system.

In addition to an SIP Mode, the process transmitter may be provided with a Water-for-Injection (WFI) Mode, a Liquid Chromatography Mode, or any other mode that can be characterized by a narrow temperature or pressure band. Within the food and beverage industry and the pharmaceutical and biopharmaceutical industries, modes such as SIP, WFI or Liquid Chromatography may be desirable, depending on the configuration.

Generally, a WFI system, as discussed herein, is a continuously circulating ultra-pure water system. Within the biopharmaceutical manufacturing industry, some processes commonly require a source of ultra-pure water. The ultra-pure water is used in cleaning, and is sometimes used as a transport and hydration media. The ultra-pure water in these systems must be held at high temperatures to insure sterility (a self-sterilization temperature).

Liquid chromatography is also used in the biopharmaceutical manufacturing processes, and customers may want sensors adapted to operate in a Liquid Chromatography mode. For example, the final product that has been grown through fermentation or culturing in the biopharmaceutical manufacturing process must be harvested from the growing media. The procedure sometimes used is known as high purity liquid chromatography, which is often done at very cold temperatures to achieve optimal filtration results. Customers may want their process transmitters to provide a selectable mode characterized for the cold temperature range.

Additionally, depending on the implementation, other selectable modes of operation may be desirable and can be defined by the customer. In other words, the customer can define an operational mode within a range of temperatures and/or pressures for which additional characterization data points is desirable. The manufacturer or supplier can then characterize the device with additional data points over that customer-defined range in order to provide characterization coefficients for the selectable mode.

In general, within the SIP, WFI, Liquid Chromatography, or other customer-defined modes of operation, the pressure and temperature are measured within a narrow subset of the normal operating range. By providing an advanced feature to select between modes, the appropriate mode with its associated characterization coefficients can be selected for the process conditions. As a result, the compensated output signal generated by the circuitry 312 can be a more accurate representation of the sensed parameter than if the standard characterization coefficients were utilized.

Figure 4:
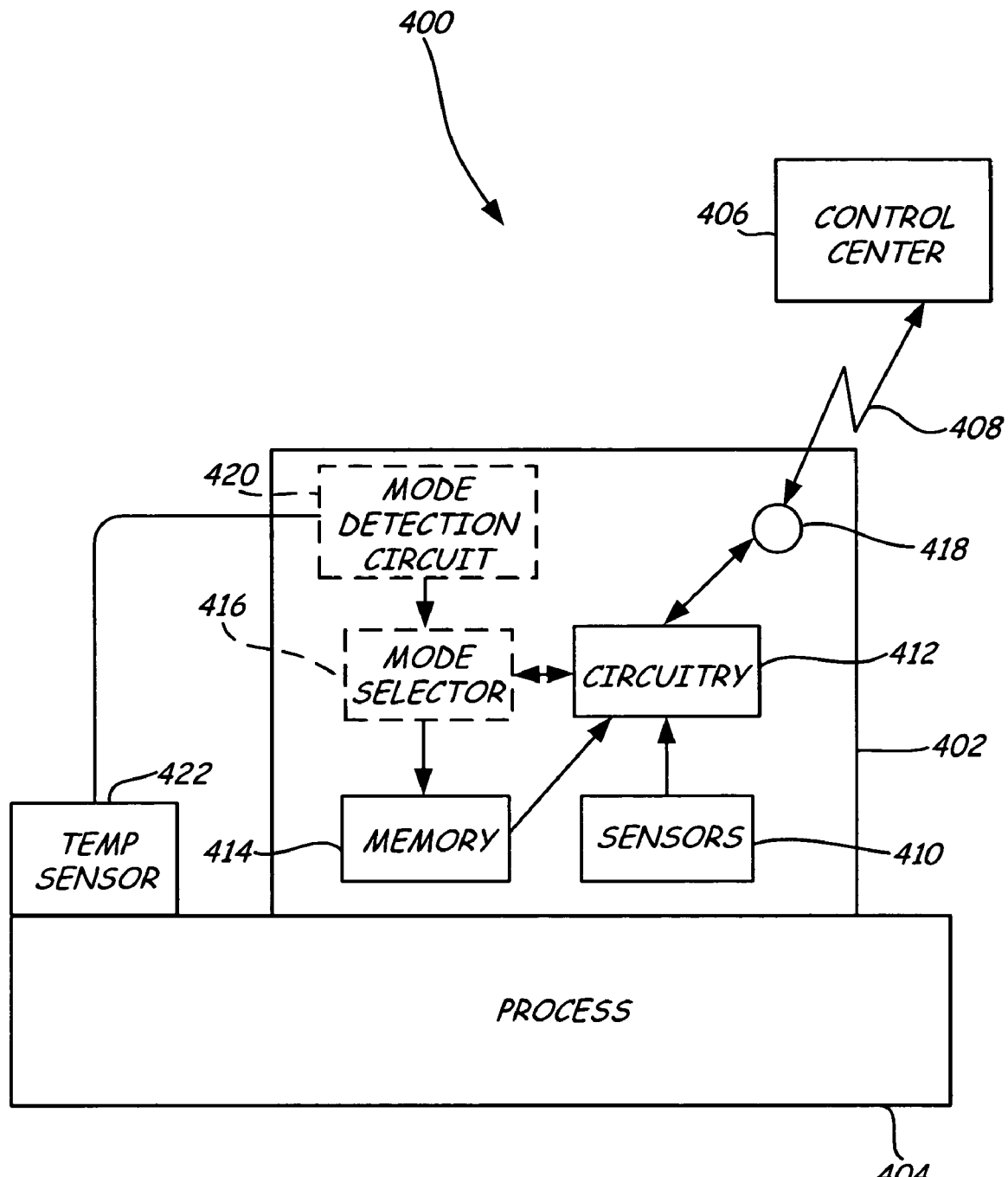
FIG. 4 is a simplified block diagram of a system with circuitry adapted to automatically change operating modes according to a detected process condition.

FIG. 4 shows a process transmitter system 400 according to an alternative embodiment of the present invention. The process transmitter system 400 includes transmitter 402 mechanically coupled to process 404 and connected to control center 406 via communications link 408 (which may be wired or wireless).

Sensors 410 are disposed within the transmitter 402 and are adapted to sense a process parameter (such as pressure) of the process 404. The sensors 410 may also include a temperature sensor adapted to measure the temperature of another sensor (such as for example the temperature of the pressure sensor). The sensors 410 generate outputs associated with the sensed parameters, and the output is passed to the circuitry 412, which utilizes the compensation polynomial equations to compensate the sensed output prior to transmitting the sensed output to the control center 406 via the communications link 408.

Memory 414 stores the characterization coefficients for one or more Modes of operation. Mode selector 416 selects which set of characterization coefficients the memory 414 provides to the circuitry 412 for compensating the sensed parameters from the sensors 410. Circuitry 412 generates a compensated output signal, which is passed to transceiver 418 for transmission over communications link 408.

The mode selector 416 may be an advanced software feature. Alternatively, the mode selector 416 may be implemented in circuitry. In either instance, the mode selector 416 may be controlled via signals transmitted from the control center 406. Additionally, process transmitter 402 is provided with mode detection circuit 420 and temperature sensor 422, which is mechanically coupled to the process 404. The temperature sensor 422 is shown outside of the process transmitter 402, but it may be positioned within the process transmitter 402, provided it is adapted to monitor the temperature of the process 404.

Temperature sensor 422 measures a process temperature, which is processed by mode detection circuit 420. In this embodiment, the mode detection circuit 420 may be part of the circuitry 412 or may be a separate element. Alternatively, mode detector circuitry 420 may be a software feature. Regardless of the specific implementation, the mode detection circuit 420 monitors the temperature of the process 404 based on the measurements of the temperature sensor 422. When the process temperature falls within the narrower range associated with a narrower mode of operation for which the memory has a stored set of characterization coefficients, the mode detection circuit 420 causes the mode selector 416 to change the operational mode of the process transmitter 400. In other words, mode detection circuit 420 monitors process 404, and automatically changes the mode of the process transmitter 400 via mode selector 416 to match the process conditions.

By automatically detecting the operational mode of process 404, process transmitter 400 can change operational modes on the fly to produce an output that more accurately represents the sensed parameter.

One technique for automatically detecting the operational mode of the process is to monitor a rate of change or gradient over a pre-determined time period or between two sensors that are spaced apart. For example, an SIP process typically changes the measured temperature of the system components rapidly as compared to temperature changes within a fluid during standard operation. Moreover, such changes would typically be detected first by sensors close to the steam injection location as compared with sensors located further downstream in the process. Thus, in one embodiment, automatic detection of a change of mode can be based on the gradient of the system temperature over time or between two sensors.

Figure 5:
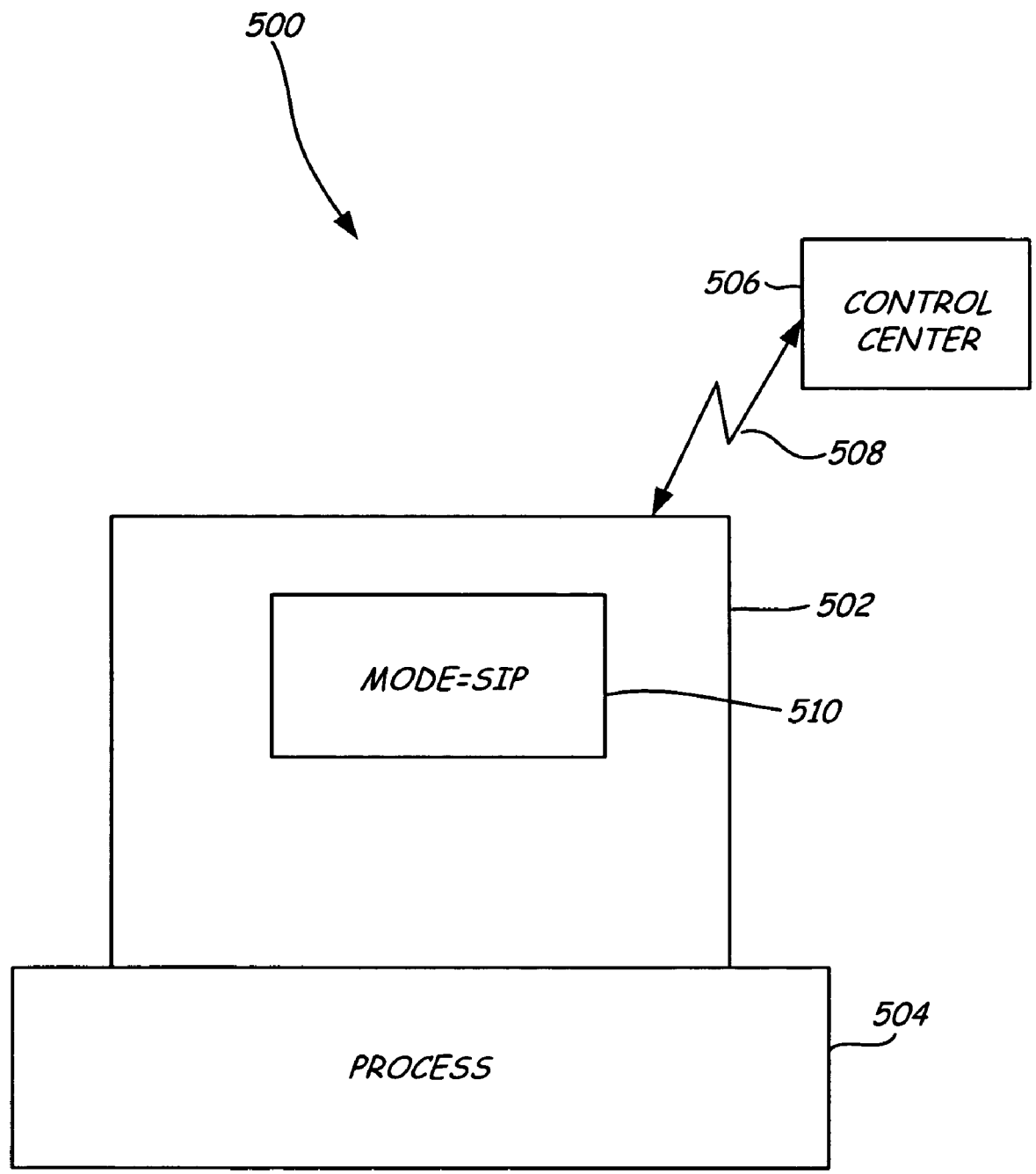
FIG. 5 is a simplified block diagram of a system with a mode display according to an embodiment of the present invention.

FIG. 5 is a simplified block diagram of a process transmitter 500 having a display according to an embodiment of the present invention. Process transmitter 500 includes transmitter 502 mechanically coupled to process 504. As discussed above, the transmitter 500 includes circuitry and sensors adapted to measure a process variable, to compensate the measured variable using characterization coefficients stored in a memory within the transmitter 502, and to transmit the compensated variable to control center 506 via communications link 508 (wired or wireless). Display 510 may be provided on the housing of the transmitter 502 to provide a visible indicator of the operational mode of the transmitter 502 at any given time. In other words, the circuitry within the transmitter 502 may be adapted to direct a signal indicating the current operating mode of the transmitter 502 to the display 510. For example, the display 510 may be an LCD or other simple display means capable of displaying simple ASCII text, such as "MODE=SIP", on demand. A button (not shown) may be provided on the LCD to activate the display for a few seconds on demand, so that the display 510 does not waste energy when it is not needed.

In general, by characterizing the transmitter for use within a narrow pre-defined band of operation, the characterization coefficients can be made more accurate for the narrow range of operation. In the pharmaceutical and food industries, the mode-switching process transmitter of the present invention can be used to monitor the sterilization process (SIP process), and then switch to normal operational mode for use during the normal process. Thus, the device can be sterilized even as it monitors the sterilization process to protect against overpressures and the like.

In an alternative embodiment, the characterization coefficients for the particular process transmitter may be stored at the control center rather than in a memory attached to the device. In this embodiment, the transmitter transmits raw measurement data to the control center, where systems can utilize the characterization coefficients and the system's operational mode to compensate the output.

While the present invention has been described with respect to pressure sensors, it is applicable for most process transmitters where temperature may impact the accuracy of the output. Moreover, the concept of providing the attached device with an advanced feature corresponding to a narrower band of operation may be extended to other applications as well.

In addition to the enhanced temperature performance described above, when the transmitter is placed in a particular operating mode, the process transmitter circuitry may enforce other pre-set configuration parameters. For example, the process transmitter may have different pressure and temperature alert levels associated with the different modes of operation. As such, if the alert levels are exceeded while the transmitter is in a particular operating mode, an alarm can be generated and transmitted to the control center.

Although the present invention has been described with reference to preferred embodiments, workers skilled in the art will recognize that changes may be made in form and detail without departing from the spirit and scope of the invention.

What is claimed is:

1. A transmitter for measuring a process variable of an industrial process, the transmitter comprising:
    a housing configured to mount to the industrial process;
    a sensor adapted to measure the process variable and to generate a sensor output;
    a mode selector adapted to select between operational modest at least one operational mode related to operation of the industrial process and an operational range of the sensor; and
    circuitry in the housing adapted to compensate the sensor output according to the at least one operational mode and to generate a transmitter output representative of the measured process variable.

2. The transmitter of claim 1 wherein the mode selector is implemented in software.

3. The transmitter of claim 1 wherein the mode selector comprises:
    a communication interface adapted to receive a user selection; and
    a memory storage containing characterization coefficients associated with each of the operational modes.

4. The transmitter of claim 3 wherein the circuitry is adapted to receive the characterization coefficients associated with a selected operational mode and to process the sensor output using the characterization coefficients.

5. The transmitter of claim 1 wherein the sensor is a pressure sensor.

6. The transmitter of claim 1 and further comprising:
    a wireless transceiver adapted to transmit the transmitter output to a control center.

7. The transmitter of claim 1 and further comprising:
    a transceiver adapted to send transmitter output signals to a control center and to receive control signals from the control center;
    wherein the received control signals control the mode selector to select the operational mode.

8. The transmitter of claim 1 and further comprising:
    a mode detection circuit adapted to automatically detect operating conditions of the industrial process and to select the operational mode of the transmitter based on the detected operating conditions.

9. The transmitter of claim 1 wherein the operational modes comprises a water for injection mode or a liquid chromatography mode.

10. The transmitter of claim 1 wherein the operational mode comprises a sterilize in place mode.

11. The transmitter of claim 1 wherein a user selects the operating mode prior to measuring the process parameter.

12. The transmitter of claim 1 further comprising:
    a display adapted to show the operating mode.

13. A transmitter for measuring a process variable associated with an industrial process, the transmitter comprising:
    a housing configured to mount to the industrial process;
    a sensor adapted to measure the process variable and to generate a sensor output; and
    circuitry in the housing adapted to select between sets of characterization information, each set of characterization information relating transmitter output to a range of operating conditions related to operation of the industrial process, the circuitry adapted to compensate the sensor output according to the selected set of characterization information and to generate the transmitter output compensated for the operating condition.

14. The transmitter of claim 13 wherein the circuitry comprises: a microprocessor adapted to compensate the sensor output according to a polynomial equation and the selected set of characterization information; and a mode selector adapted to select between the sets of characterization information.

15. The transmitter of claim 13 wherein at least two sets of characterization information are stored in the transmitter and wherein a first set of the at least two sets of characterization information represents a sub-set of a second set of characterization information.

16. The transmitter of claim 13 and further comprising:
    a transceiver adapted to send transmitter signals to a control center and to receive control signals from the control center.

17. The transmitter of claim 16 wherein the transceiver is a wireless transceiver adapted to transmit and receive signals to and from the control center wirelessly.

18. A process sensor for measuring a process variable of an industrial process and characterized for compensation of the measured process variable for two or more operating modes, the process sensor comprising:
    a housing configured to mount to the industrial process;
    a sensing element adapted to measure the process variable and to generate a sensor output; and
    a microprocessor in the housing adapted to process the sensor output into a transmitter output according to one of the two or more operating modes related to operation of the industrial process; and
    a transceiver in the housing adapted to transmit the transmitter output to a control center.

19. The process sensor of claim 18 wherein the microprocessor comprises:
    a mode selector adapted to receive an input and to select one of the two or more operating modes based on the received input; and
    circuitry adapted to process the sensor output according to coefficients associated with the selected one of the operating modes.

20. The process sensor of claim 18 wherein each operating mode corresponds to a set of characterization coefficients of the sensing element over a range of temperatures and pressures.

21. The process sensor of claim 20 wherein at least one of the operating modes corresponds to a temperature range that is a subset of a temperature range of another operating mode.

22. The process sensor of claim 18 wherein the sensing element is a pressure sensor.

23. The process sensor of claim 18 wherein the transceiver transmits signals wirelessly between the process sensor and the control center.

24. A transmitter for measuring a process variable of an industrial process, the transmitter comprising:
    a housing configured to mount to the industrial process;
    a sensor adapted to measure the process variable and to generate a sensor output;

a first characterization relating transmitter output to a first range of operating conditions of the industrial process;

a second characterization relating the transmitter output to a second range of operating conditions of the industrial process; and circuitry in the housing adapted to select between the first and the second characterizations and to compensate the sensor output according to the selected characterization in order to generate the transmitter output compensated for the operating condition.

25. The transmitter of claim 24 wherein the first range and the second range partially overlap.

26. The transmitter of claim 24 wherein the first range and the second range do not overlap.

27. The transmitter of claim 24 and further comprising: memory adapted to store the characterizations.

28. The transmitter of claim 24 wherein the characterizations are stored in a look up table and wherein the circuitry is adapted to look up the characterizations as needed.

29. The transmitter of claim 24 wherein the circuitry comprises:

a mode selector adapted to automatically select between the characterizations based on detection of a gradient of a process variable.

30. The transmitter of claim 29 wherein the process variable is temperature.

31. The transmitter of claim 24 and further comprising: a communications interface adapted to receive user input.

32. The transmitter of claim 31 wherein the user input is a characterization selection.

33. The transmitter of claim 24 wherein the first characterization and the second characterization are received from a control center via a communications link.

34. The transmitter of claim 24 wherein the second characterization relates to at least one of the set of sterilize in place, water for injection, and liquid chromatography.

* * * * *

UNITED STATES PATENT AND TRADEMARK OFFICE
CERTIFICATE OF CORRECTION

| | |
|---|---|
| PATENT NO. | : 7,164,355 B2 |
| APPLICATION NO. | : 10/849178 |
| DATED | : January 16, 2007 |
| INVENTOR(S) | : Schnaare et al. |

It is certified that error appears in the above-identified patent and that said Letters Patent is hereby corrected as shown below:

Column 9,
Line 22 delete "modest" and insert --modes, --.

Signed and Sealed this

Twenty-fourth Day of July, 2007

JON W. DUDAS
*Director of the United States Patent and Trademark Office*